(12) United States Patent
Arditti et al.

(10) Patent No.: US 8,543,800 B2
(45) Date of Patent: Sep. 24, 2013

(54) HIERARCHICAL SERVICES STARTUP SEQUENCING

(75) Inventors: Kanael Arditti, Tel Aviv (IL); Liran Zvibel, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 12/481,945

(22) Filed: Jun. 10, 2009

(65) Prior Publication Data

US 2010/0318780 A1 Dec. 16, 2010

(51) Int. Cl.
| | |
|---|---|
| G06F 9/00 | (2006.01) |
| G06F 9/24 | (2006.01) |
| G06F 15/177 | (2006.01) |
| G06F 7/00 | (2006.01) |
| G06F 17/00 | (2006.01) |
| G06F 12/00 | (2006.01) |
| G06F 17/30 | (2006.01) |

(52) U.S. Cl.
USPC .................... 713/2; 713/1; 707/694; 707/829

(58) Field of Classification Search
USPC .................. 713/1, 2; 707/694, 829; 709/216
See application file for complete search history.

(56) References Cited

U.S. PATENT DOCUMENTS

| | | | |
|---|---|---|---|
| 6,453,426 B1 | 9/2002 | Gamache et al. | |
| 6,505,228 B1 * | 1/2003 | Schoening et al. | ........... 718/106 |
| 6,792,526 B1 | 9/2004 | Klein et al. | |
| 7,185,076 B1 | 2/2007 | Novaes et al. | |
| 7,389,410 B1 * | 6/2008 | Hardman | .......................... 713/1 |
| 7,448,030 B2 | 11/2008 | Liu et al. | |
| 7,464,147 B1 | 12/2008 | Fakhouri et al. | |
| 7,519,600 B1 | 4/2009 | Zenz | |
| 8,020,034 B1 * | 9/2011 | Shrivastava et al. | ......... 714/4.11 |
| 2004/0003055 A1 * | 1/2004 | Holland et al. | ................ 709/219 |
| 2005/0210473 A1 * | 9/2005 | Inchingolo et al. | ........... 718/107 |
| 2006/0168152 A1 | 7/2006 | Soluk et al. | |
| 2008/0161941 A1 | 7/2008 | Strassner et al. | |
| 2008/0244253 A1 | 10/2008 | Corrao et al. | |

* cited by examiner

Primary Examiner — Kim Huynh
Assistant Examiner — Brandon Kinsey
(74) Attorney, Agent, or Firm — Griffiths & Seaton PLLC (57) ABSTRACT

Exemplary methods, system, and computer program product embodiments for managing services within a data storage subsystem using a processor in communication with a memory device during a startup sequence are provided. At least one service facilitated by a provider is provided. At least one requirement is linked to the at least one service. The at least one service and the at least one requirement are incorporated into a specification file. A directed acyclic graph, interrelating the at least one service and an additional service based on the at least one requirement, is constructed. The directed acyclic graph is traversed using an initialization process to generate a determination which of an available plurality of services to provide. The determination further includes an analysis of the which of the available plurality of services to provide in view of at least one hardware resource in the data storage subsystem.

25 Claims, 5 Drawing Sheets

Example of a structured services graph specification:

```xml
====
<root>
   <node_type name="platform" enum="PLATFORM_NODE" run_on_system="yes"/>
   <node_type name="cache" enum="CACHE_NODE" base_offset="0">
     <label value="SCSI_NODE"/>
     <module>
       <requirement value="DATA_DISK"/>
     </module>
     <service executable_name="cte">
       <requirement value="BASE"/>
       <requirement value="SATA"/>
       <requirement value="ISCSI_TARGET"/>
       <requirement value="ISCSI_INITIATOR"/>
       <requirement value="HW_AVAILABILITY"/>
       <provides value="CACHE"/>
     </service>
   </node_type>

<node_type name="interface" enum="IF_NODE">
     <label value="SCSI_NODE"/>
     <module>
       <requirement value="SCSI_INTERFACE"/>
       <requirement value="SYSTEM_DISK"/>
     </module>
     <service executable_name="i_node">
       <requirement value="BASE"/>
       <requirement value="SCSI_TARGET"/>
       <requirement value="LSI_TARGET"/>
       <requirement value="FC_SCSI"/>
       <requirement value="ISCSI_INITIATOR"/>
       <requirement value="HW_AVAILABILITY"/>
       <provides value="INTERFACE"/>
       <relevant_file value="__NO_FILE__"/>
     </service>
   </node_type>

<node_type name="upgrade" enum="UPGRADE_NODE"/>

<node_type name="management" enum="MANAGEMENT_NODE">
     <label value="SINGLETON_NODE"/>
     <service executable_name="manager">
       <requirement value="BASE"/>
       <provides value="MANAGER"/>
     </service>
   </node_type>
   <node_type name="gateway" enum="GW_NODE" base_offset="3100">
     <label value="SCSI_NODE"/>
     <module>
       <requirement value="SCSI_INTERFACE"/>
     </module>
     <service executable_name="gw_node">
       <requirement value="BASE"/>
       <requirement value="FC_SCSI"/>
       <requirement value="LSI_INITIATOR"/>
       <requirement value="ISCSI_INITIATOR"/>
       <requirement value="HW_AVAILABILITY"/>
       <provides value="GATEWAY"/>
     </service> </node_type>

<node_type name="pseudo node" enum="PSEUDO_NODE"/>

<node_type name="event node" enum="EVENT_NODE">
     <label value="SINGLETON_NODE"/>
     <service executable_name="event_node">
       <requirement value="BASE"/>
       <requirement value="HW_AVAILABILITY"/>
       <provides value="EVENT_NODE"/>
     </service>
   </node_type>

<node_type name="cluster node" enum="CLUSTER_HW_NODE">
     <label value="SINGLETON_NODE"/>
     <service executable_name="cluster_hw">
       <requirement value="BASE"/>
       <requirement value="HW_AVAILABILITY"/>
       <provides value="CLUSTER_HW_MON"/>
     </service>
   </node_type>

<node_type name="hw mon node" enum="HW_MON_NODE">
     <service executable_name="hw_mon_node">
       <requirement value="BASE"/>
       <requirement value="IPMI"/>
       <requirement value="URPC"/>
       <requirement value="SX"/>
       <requirement value="$FC_SCSI"/>
       <requirement value="SATA"/>
       <requirement value="HW_AVAILABILITY"/>
       <provides value="HW_MON"/>
     </service>
   </node_type>

<node_type name="event saver" enum="EVENT_SAVER_NODE">
     <module>
       <requirement value="SYSTEM_DISK"/>
     </module>
     <service executable_name="event_saver">
       <requirement value="BASE"/>
       <requirement value="LOCAL_STORAGE"/>
       <provides value="EVENT_SAVER"/>
     </service>
   </node_type>

<node_type name="admin server" enum="ADMIN_SERVER_NODE">
     <label value="NODE_THAT_STAYS_UP_AFTER_SHUTDOWN"/>
     <module>
       <requirement value="MANAGEMENT_PORT"/>
     </module>
     <service executable_name="aserver">
       <requirement value="BASE"/>
       <requirement value="STUNNEL"/>
       <requirement value="ADMINISTRATOR"/>
       <provides value="ASERVER"/>
       <provides value="MANAGEMENT_PORT"/>
     </service>
   </node_type>

<node_type name="equip master" enum="EQUIP_MASTER_NODE">
     <service executable_name="equip_master" >
       <requirement value="BASE" />
       <requirement value="HW_AVAILABILITY"/>
       <provides value="EQUIP_MASTER" />
     </service>
   </node_type>
</root>
```

FIG. 4

Example of code which is implemented by each service:

Primitives:

Service__new
Service__start
Service__finish_async_start
Service__stop
Service__status
Service__is_satisfied
Service__add_all_provided_requirements
Service__add_all_required_requirements

Main Logic:

```
function get_derived_services_sortlist(affected_services, derived_sortlist)
  RequirementsList derived_requirements = EMPTY_LIST;
  for each service S in affected_services:
    derived_requirements = add_service_if_not_there(derived_sortlist, S)
  // Now we should go over the list of all serivces, and check whether there are services that
  // should also go down...
  boolean was_added
  do {
    was_added = FALSE;
    for each service S in affected_services:
      // Service__are_requirements_needed recursively calls this function
      if (Service__are_requirements_needed(S, &derived_requirements)) {
        was_added = add_service_if_not_there(derived_sortlist, derived_requirements, S)
      }
    }
  } while (TRUE == was_added);
```

Truncations of services:

```
/**
 * The apply services list function should make sure that it either returns 0, or, if it returnes SERVICES_SERVICE_IN_PROGRESS
 * then by the next time Services__reenter_satisfaction_process runs, the rpc will get back to the correct caller.
 */
function apply_services_list(needed_services)

// Now go over all the services in the services_tracker, and find which ones should be removed.
  for all services known: S
    if not is_service_in_list(needed_services, S))
      // stop the service, free it, and remove the pointer from the list.
      Service__stop(S)

// Now go over all the servises that should be running and make sure they are running and present in the service tracker.
  for each service in needed_services: S
    if not ServiceTracker__is_service_running(S)
      Service__start(S)
```

FIG. 5

HIERARCHICAL SERVICES STARTUP SEQUENCING

BACKGROUND OF THE INVENTION

1. Field of the Invention

The present invention relates in general to computers, and more particularly to a method, system, and computer program product for implementation of hierarchical services startup sequencing in computer environments such as a data processing storage subsystem.

2. Description of the Related Art

As computing environments grow more sophisticated and more interdependent, a growing variety of services are provided. For example, in a clustered storage controller, many services are provided by a variety of interconnected components such as hardware, software, and firmware components. Managing such a large interdependent network of services poses potential challenges for system administrators.

Traditionally, an administrator may turn to such solutions as a System V (SysV) initialization (init) system for management functionality, particularly in relation to startup sequencing. However such current solutions contain limitations such as interdependencies between services not explicitly set forth, and a final machine state being only a specific run level, which is a lower granularity than what may be needed by the administrator.

SUMMARY OF THE INVENTION

In view of the foregoing, a need exists for a mechanism to better manage a potentially complex set of interdependent services provided by a large variety of components in computing environments. Accordingly, exemplary method, system, and computer program product embodiments for managing services within a data storage subsystem using a processor in communication with a memory device during a startup sequence are provided. At least one service facilitated by a provider is provided. The at least one service is operational on the processor. At least one requirement is linked to the at least one service. The at least one service and the at least one requirement are incorporated into a specification file. A directed acyclic graph, interrelating the at least one service and an additional service based on the at least one requirement, is constructed. The directed acyclic graph is traversed using an initialization process to generate a determination which of an available plurality of services to provide. The determination further includes an analysis of the which of the available plurality of services to provide in view of at least one hardware resource in the data storage subsystem.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only exemplary embodiments of the invention and are not therefore to be considered to be limiting of its scope, the invention will be described and explained with additional specificity and detail through the use of the accompanying drawings, in which:

FIG. 4 depicts an XML specification of a graph of services and their interconnections; and FIG. 5 depicts exemplary pseudocode implementing various aspects of the present invention and claimed subject matter.

DETAILED DESCRIPTION OF THE DRAWINGS

The illustrated embodiments below provide mechanisms for managing a potentially complex network of interdependent services provided by a possible number of components in computing environments such as a storage system. The illustrated embodiments make use of a directed acyclic graph, which is traversed during a startup sequence to determine which of the available services to provide for what is requested. The implementation and use of such a graph will be further described, following.

Throughout the following description, reference is made to "provider," which is intended to refer to a process, program, script, and the like, which implements a service. Reference is also made to a "service," which is intended to refer to any general service provided by the computing environment. A service, for example, may be implemented by a computer program operational in the computing environment. For example, "ext3" may be a provider that implements the "filesystem" service. Similarly, "fat" may refer to an additional provider that may implement the same "filesystem" service.

As will be seen, following, the illustrated embodiments define, for each available provider, what "requirements" the provider contains. These requirements may refer to other services available in the computing environment. In addition to defining such requirements for each provider, each service provided by the provider is also defined. Means for start/stop/obtaining status from the provider are additionally defined. These definitions are placed in a specification file that will be used later to construct a hierarchy of interrelated services to obtain the directed acyclic graph. This graph is later traversed by an initialization (init) process during a startup sequence to identify which of all of the available services to attempt.

Figure 1:
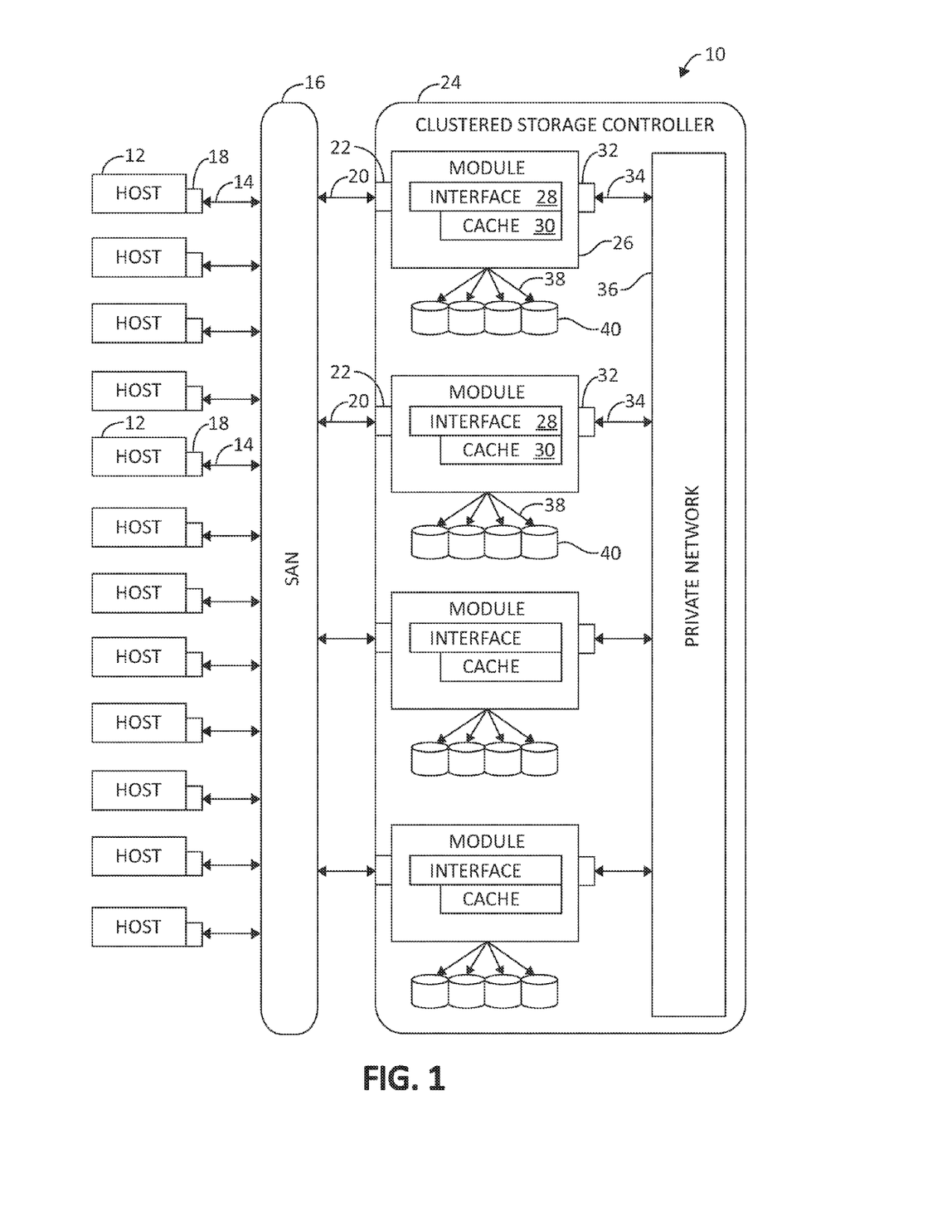
FIG. 1 is a block diagram of an exemplary computing environment, including a clustered storage controller in which various aspects of the claimed invention may be implemented.

Turning now to the drawings, reference is initially made to FIG. 1, which is a block diagram of an exemplary data processing storage subsystem 10, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

The storage subsystem 10 receives, from one or more host computers 12, I/O requests, which are commands to read or write data at logical addresses on logical volumes. Any number of host computers 12 is coupled to the storage subsystem 10 by any means known in the art, for example, using a network. Herein, by way of example, the host computers 12 and the storage subsystem 10 are assumed to be coupled by a Storage Area Network (SAN) 16 incorporating data connections 14 and Host Bus Adapters (HBAs) 18. The logical addresses specify a range of data blocks within a logical volume, each block herein being assumed by way of example to contain 512 bytes. For example, a 10 KB data record used in a data processing application on a host computer would require 20 blocks, which the host computer might specify as being stored at a logical address comprising blocks 1000 through 1019 of a logical volume. The storage subsystem 10 typically operates in, or as, a network attached storage (NAS) or a SAN system.

The storage subsystem 10 comprises a clustered storage controller 24 coupled between the SAN 16 and private network 36 using data connections 20 and 34, respectively, and incorporating adapters 22 and 32, again respectively. Clustered storage controller 24 implements clusters of storage modules 26, each of whom includes an interface 28 (in communication between adapters 22 and 32), and a cache 30. Each storage module 26 is responsible for a number of disks 40 by way of data connection 38 as shown.

As described previously, each storage module 26 further comprises a cache 30. However, it will be appreciated that the number of caches used in the storage subsystem 10 and in conjunction with clustered storage controller 24 may be any convenient number. While all caches 30 in the storage subsystem 10 may operate in substantially the same manner and to comprise substantially similar elements, this is not a requirement. Each of the caches 30 is typically, but not necessarily approximately equal in size and is assumed to be coupled, by way of example, in a one-to-one correspondence with a set of physical storage units, which are typically disks. In one embodiment, the disks 40 may comprise such disks. Those skilled in the art will be able to adapt the description herein to caches of different sizes, and to caches and storage devices in other correspondences, such as the many-to-many correspondence described in U.S. Patent Application Publication No. 2005/0015566, entitled "Data Allocation in a Distributed Storage System," which is assigned to the assignee of the present invention and which is incorporated herein by reference.

Each set of physical storage comprises multiple slow and/or fast access time mass storage devices, herein below assumed to be multiple hard disks. FIG. 1 shows the caches 30 coupled to respective sets of physical storage. Typically, the sets of physical storage comprise one or more disks 40, which can have different performance characteristics. In response to an I/O command, the cache 30, by way of example, may read or write data at addressable physical locations of physical storage. In the embodiment of FIG. 1, the caches 30 are shown to exercise certain control functions over the physical storage. These control functions may alternatively be realized by hardware devices such as disk controllers, which are linked to the caches 30.

In an embodiment of the present invention, the routing of logical addresses is implemented according to methods described in the above-referenced U.S. Patent Application Publication No. 2005/0015566. Routing records, indicating the association of logical addresses of logical volumes with partitions and the association of the partitions with caches, are distributed by the SAN 16 to one or more generally similar network interfaces 28 of the storage modules 26. It will be understood that the storage subsystem 10, and thereby, the clustered storage controller 24, may comprise any convenient number of network interfaces 28. Subsequent to the formation of the disks 40, the network interfaces 28 receive I/O commands from the host computers 12 specifying logical addresses of the disks 40. The network interfaces use the routing records to break the commands into I/O instructions, or command subsets, that are then distributed among the caches 30.

Each storage module 26 is operative to monitor its state, including the states of associated caches 30, and to transmit configuration information to other components of the storage subsystem 10 for example, configuration changes that result in blocking intervals, or limit the rate at which I/O requests for the sets of physical storage are accepted.

Routing of commands and data from the HBAs 18 to the clustered storage controller 24 to each cache 30 is typically performed over a network and/or a switch. Herein, by way of example, the HBAs 18 may be coupled to the storage modules 26 by at least one switch (not shown) of the SAN 16 which can be of any known type having a digital cross-connect function. In addition, the HBAs 18 may be directly coupled to the storage modules 26 in an additional implementation.

Data having contiguous logical addresses are generally distributed among the disks 40. This can be accomplished using the techniques disclosed in the above-referenced U.S. Patent Application Publication No. 2005/0015566. Alternatively, the data can be distributed using other algorithms, e.g., byte or block interleaving. In general, this increases bandwidth, for instance, by allowing a volume in a SAN or a file in network attached storage to be read from or written to more than one disk at a time. However, this technique requires coordination among the various disks, and in practice may require complex provisions for disk failure, and a strategy for dealing with error checking information, e.g., a technique for storing parity information relating to distributed data. Indeed, when logical unit partitions are distributed in sufficiently small granularity, data associated with a single logical unit may span all of the disks 40.

While not explicitly shown for purposes of illustrative simplicity, the skilled artisan will appreciate that in some embodiments, the clustered storage controller 24 may be adapted for implementation in conjunction with certain hardware, such as a rack mount system, a midplane, and/or a backplane. Indeed, the private network 36 in one embodiment may be implemented using a backplane. Additional hardware such as the aforementioned switches, processors, controllers, memory devices, and the like may also be incorporated into the clustered storage controller 24 and elsewhere within the storage subsystem 10, again as the skilled artisan will appreciate. Further, a variety of software components, operating systems, firmware, and the like may be integrated.

Clustered storage controller 24 may implement a systems management mechanism as will be further explained. One or more processor devices (which may be integrated into the storage modules 26, hosts 12, or elsewhere), in communication with one or more memory devices such as disks 40 or other devices may be utilized to generate provider, service, and requirement definitions, construct a directed acyclic graph, and traverse such a graph pursuant to a startup sequence or otherwise as will be described.

During such a startup sequence, the init process may be provided the directed acyclic graph as part of a mission or target. The services that the init process must provide are derived from this mission or target. The directed acyclic graph of service types, service requirements, and service actions is global to all nodes in a cluster. However, on each given node, a user may specify a mission for the node. The init process uses the global directed acyclic graph to determine which services to provide.

In addition to the foregoing, the directed acyclic graph is dependent on what hardware resources are available, for example, on a given storage module. For example, several service types may satisfy the same service requirement. As a result, a particular system may attempt all or any possible services as directed by the acyclic graph.

In view of the foregoing, consider the following example presented in the context of the clustered storage controller-type computing environment previously described. In such a clustered storage controller, some modules (computer nodes) act as interfaces to hosts. In this case, the mission defined for those nodes is (mission=interface node). Other modules act as data storage nodes (such as the aforementioned storage modules). In this case, the mission defined for those nodes is (mission=data cache). In other cases, some modules may have more than one mission. In all, a particular storage controller module may implement any combination of missions. Each node may be assigned a list of personalities, or a given combination of missions.

Support for requirements is provided for both so-called "strong" and for so-called "weak" requirements by the system. Strong and weak requirements imply particular dependencies or relationships between services and other requirements. For example, if a particular service A has a weak requirement for a particular service B, then service A would like to take advantage of B if available. Accordingly, B should be started after service A has started. In comparison, strong requirements are necessary for proper system operation. Accordingly if a particular service A has a strong requirement for a particular service B, then Service B should be attempted before Service A is started. As will be seen, construction of the directed acyclic graph then includes consideration of interrelating various services based on strong or weak status.

In addition to support for strong and weak types of requirements, the system provides support for so-called "group" requirements. Such group requirements may be classified in varying ways in a particular implementation. For example, if a particular service A requires a group of services B, and group B has member services, then the classification "ALL group" implies that service A requires that all members in group B are started. The classification "SOME group" implies that service A requires that at least one member in group B is started. The classification "MAX group+" implies that service A requires that as many of the members in group B as possible should be started. At least one service in group B must start successfully. Finally, the classification "MAX group−" implies that service A requires that as many of the members in group B as possible should be started, however, there is no strong dependence.

In addition to the foregoing support, the system provides support to derive a list of particular services which may be terminated or shut down when a lower level of functionality (lower service level) is needed. Services consuming additional hardware resources or bandwidth may be terminated as necessary to improve system performance, efficiency or cost-savings. In addition, as will be shown, a single service module may be configured to encapsulate differing types of services.

Figure 2:
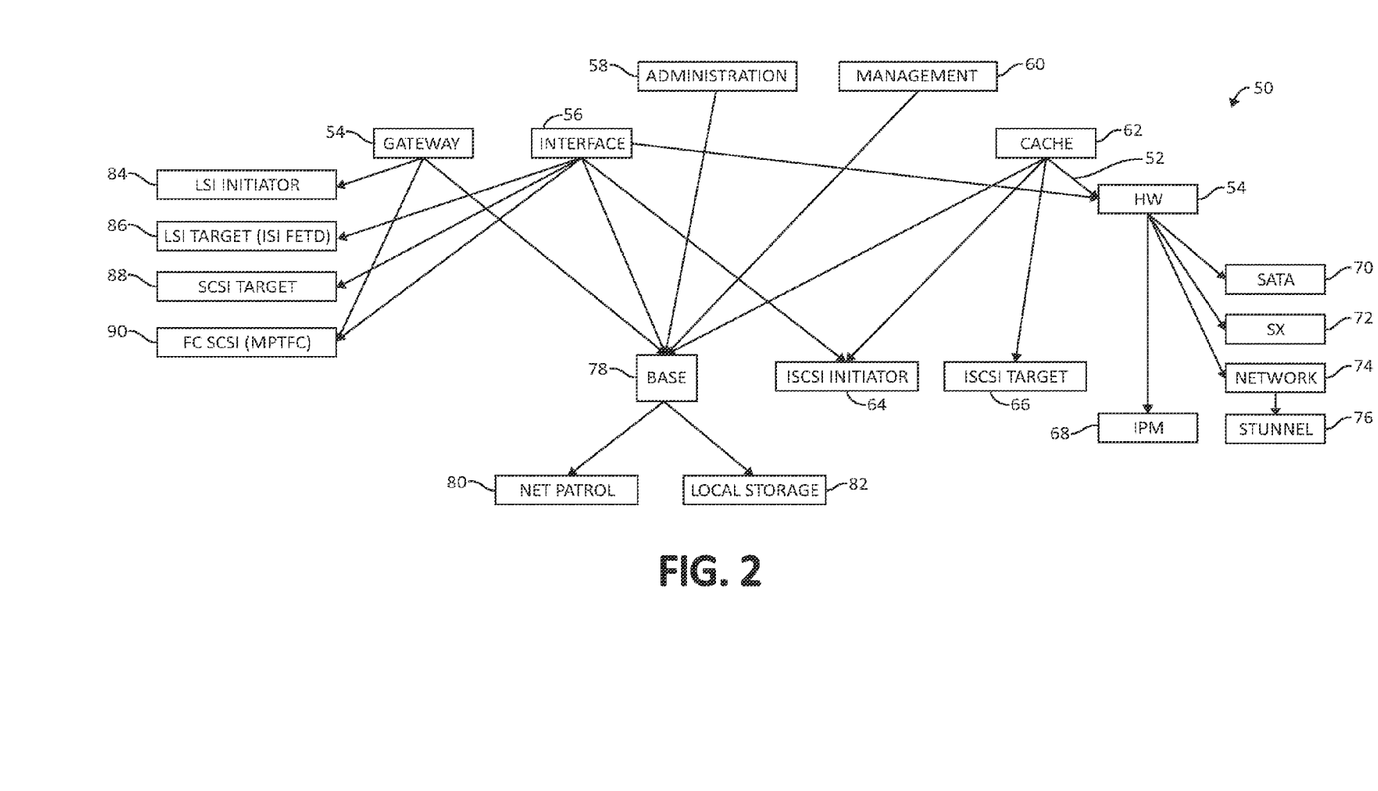
FIG. 2 is a flow diagram of an exemplary directed acyclic graph of interdependencies between provided services in a computing environment such as that shown in FIG. 1.

Turning to FIG. 2, a flow diagram of an exemplary directed acyclic graph 50 is illustrated. Graph 50 includes a number of interrelated nodes (as indicated by directed arrow 52). Each parental, child, or leaf node in the graph are interconnected by such a directed arrow as indicated. Each node can represent a user-level program, a device-driver, a kernel module, or any service which is capable of being started, stopped, and polled for status. In the depicted embodiment, graph 50 includes such parental nodes as a gateway service 54, interface service 56, admin service 58, management service 60, and cache service 62. Again, each of the parental nodes is connected using directed arrows 52.

Interface service 56 is directed between a child executable module known as hardware (HW) 54 and several other system resource services 86-90 as will be described further below. In turn, HW service 54 is directed to several hardware leaf nodes, such as Serial Advanced Technology Attachment (SATA) service 70, SX service 72 (referring to device drivers), network service 74, and Stunnel service 76 (referring to an open-source multi-platform computer program used to provide universal transport layer security/secure socket layer (TLS/SSL) tunneling services). HW service 54 is directed towards each of these various services as arrows 52 indicate. Finally HW service is also directed to IPMI service 68 (referring to the Intelligent Platform Management Interface (IPMI) specification).

As is shown in the graph 50, for HW service 54 to be operational, one or more of the defined services 68-76 are attempted. For example, the SATA service 70 may be necessary for operation of one or more storage devices, such as Hard Disk Drives (HDDs), in this example the SATA service represents a kernel module. In similar fashion, the cache service 62 is directed to the Internet Small Computer System Interface (ISCSI) initiator service 64 and the ISCSI target service 66. In these cases the services represent device drivers. For the cache node 62 to be operational, the ISCSI target service 64 and ISCSI target service 66 should be started, as data transfers involving the cache service 62 implicate these resources, as the skilled artisan will appreciate. Finally, for purposes of support for strong/weak/group requirements, it should be noted that connectivity between the interface service and the SCSI Target service is weak. The connections to the HW service (sata,sx, ip,mi, network) form a group.

Administration service 58 is directed to base service 78 for implementing base object types, configuration services, events, and inter-node communication. In turn, base service 78 is directed towards net patrol service 80, a daemon having responsibility to monitor and manage the Internet Protocol (IP) routing table, and local storage service 82 for administration and management of local storage resources (such as a local storage controller).

Besides direction to HW service 54 as was previously described, interface service 56 is directed to various additional storage resources 86-90, including an LSI® Target service 86, an SCSI target service 88, and a Fibre Channel (FC) SCSI service 90. Finally, gateway service 54 is directed to the aforementioned services 86-90 and including LSI® Initiator service 84 and to the base service 78. Directed acyclic graph 50 as shown represents a portion of available storage resources in a particular clustered storage controller environment. As the skilled artisan will appreciate, the directed acyclic graph 50 as shown may be altered in specific implementations. For example, additional services nodes may be incorporated.

Figure 3:
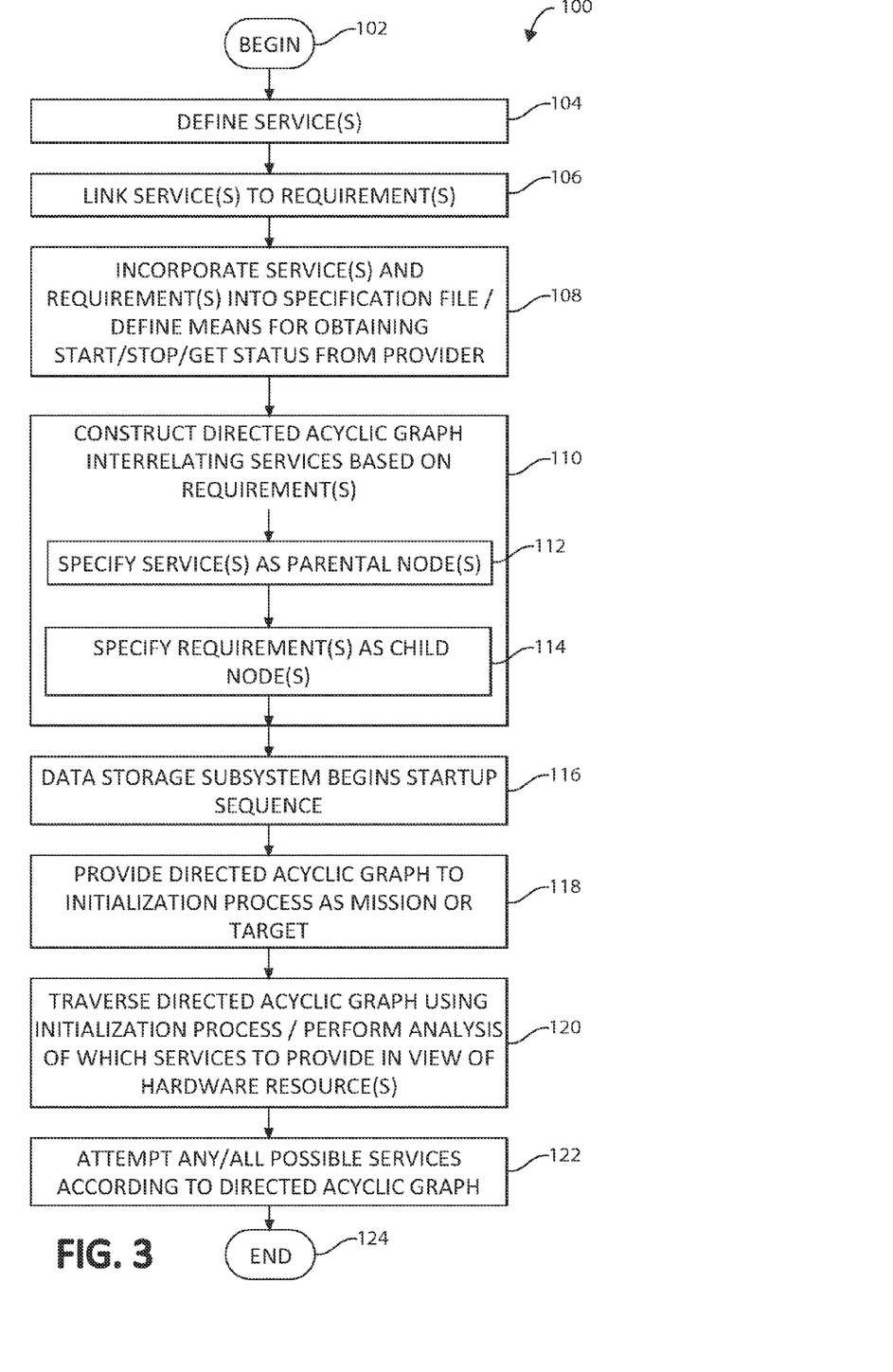
FIG. 3 is a flow chart diagram of an exemplary method for managing services in a computing environment such as a data processing storage system implementing use of the directed acyclic graph as illustrated in FIG. 2.

Turning now to FIG. 3, following, an exemplary method 100 for managing services in a computing environment such as a data processing storage system implementing use of the directed acyclic graph as illustrated in FIG. 2 is illustrated. As one skilled in the art will appreciate, various steps in the method 100 (as well as in the following exemplary methods later described) may be implemented in differing ways to suit a particular application. In addition, the described methods may be implemented by various means, such as hardware, software, firmware, or a combination thereof operational on or otherwise associated with the storage environment. For example, a method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 100 begins (step 102) by defining various services in the data processing storage system (step 104). These may include the various services shown previously in FIG. 2. As a next step, the services are linked to various requirements, or a list of other services that the particular service requires in order to function (step 106). The service(s) and requirement(s) are incorporated into a specification file. In addition, means for obtaining a start, a stop, and a get status from a particular service are defined (step 108).

Based on the defined services and requirements, the directed acyclic graph is constructed, which interrelates the service(s) based on the requirement(s) (step 1 10). As part of this functionality, a service or services may be specified as a parental node or nodes (step 112), and other service or services (requirements) may be specified as a child node or nodes (step 114). Further, as part of this functionality, group requirement support, weak and strong requirement support may be provided. For example, in constructing the directed acyclic graph interrelating a particular service, consideration may be made for a related strong requirement, a related weak requirement, or a related group requirement.

The data storage subsystem then begins a startup sequence (step 116). In conjunction with this sequence, the services represented by the directed acyclic graph are provided to an initialization process as a mission or target (step 11 8). The process traverses the directed acyclic graph, and performs an analysis of which service(s) to provide in view of various hardware resources (step 120). Here as before, any or all related services should be attempted pursuant to these hardware resources (step 122). The method 100 then ends (step 124).

FIG. 4 depicts an XML specification of a graph of services and their interconnections. FIG. 5 depicts exemplary pseudocode implementing various aspects of the present invention and claimed subject matter, as the skilled artisan will appreciate. As with the flow chart diagram presented in FIG. 3, previously, it should be noted that the pseudocode illustrations are only exemplary and may be altered or implemented in various ways.

Turning first to FIG. 4, exemplary XML specification for a graph depicts an example of a structured services directed acyclic graph specification. For example, for node "EQUIP_MASTER_NODE" referring to service "equip_master", two required services "BASE" and "HW_AVAILABILITY" are derived.

FIG. 5, following, depicts exemplary pseudocode for deriving the list of services that must be stopped and the list of services the must be started, given an old mission and a new mission according to the directed acyclic graph. A first section of code describes implemented services primitives, such as "new," "start," "status," and the like. A second section of code depicts the main logic of traversing the list of services to obtain related services (affected services), and traversing the entire list of services to determine if additional requirements (additional services) should be incorporated given the new mission. A final section of code depicts the logic of traversing the list of services to determine if any services relevant to the old mission should be truncated or stopped in view of the new mission.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for storage for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing services within a data storage subsystem using a processor in communication with a memory device during a startup sequence, comprising:
    defining a first service facilitated by a provider, wherein the provider is operational by the processor;
    linking at least one requirement to the first service;
    incorporating the first service and the at least one requirement into a specification file;
    constructing a directed acyclic graph interrelating the first service and a second service based on the at least one requirement; and
    traversing the directed acyclic graph using an initialization process to generate a determination which of an available plurality of services to provide; wherein:
        the determination further includes an analysis of the which of the available plurality of services to provide in view of at least one hardware resource in the data storage subsystem, and
        constructing the directed acyclic graph comprises interrelating the first service and the second service based on one of a weak requirement dependency and a strong requirement dependency of the first service and the second service, the weak requirement dependency comprising starting the second service after starting the first service and the strong requirement dependency comprising starting the second service prior to starting the first service.

2. The method of claim 1, wherein the defining the first service is performed for each of a plurality of available providers to generate the available plurality of services facilitated by a plurality of providers.

3. The method of claim 1, wherein constructing the directed acyclic graph includes performing at least one of:
    specifying the first service as a parental node of the directed acyclic graph, and
    specifying the at least one requirement as a child node of the directed acyclic graph.

4. The method of claim 1, wherein constructing the directed acyclic graph further includes interrelating at least one group requirement dependency.

5. The method of claim 1, wherein the incorporating the first service and the at least one requirement into the specification file further includes defining means for obtaining from the provider at least one of a start, a stop, and a get status operation.

6. The method of claim 1, further including, pursuant to the startup sequence, providing the first service and the second service represented by the directed acyclic graph as a target; wherein the first service is derived by the initialization process from the target.

7. A system for managing services within a data storage subsystem during a startup sequence, comprising:
   a processor operational in the data storage subsystem, wherein the processor is adapted for:
      defining at least one a first service facilitated by a provider, wherein the provider is operational by the processor,
      linking at least one requirement to the first service,
      incorporating the first service and the at least one requirement into a specification file,
      constructing a directed acyclic graph interrelating the first service and a second service based on the at least one requirement, and
      traversing the directed acyclic graph using an initialization process to generate a determination which of an available plurality of services to provide; wherein:
         the determination further includes an analysis of the which of the available plurality of services to provide in view of at least one hardware resource in the data storage subsystem, and
         constructing the directed acyclic graph comprises interrelating the first service and the second service based on one of a weak requirement dependency and a strong requirement dependency of the first service and the second service, the weak requirement dependency comprising starting the second service after starting the first service and the strong requirement dependency comprising starting the second service prior to starting the first service.

8. The system of claim 7, wherein the processor is further adapted for performing the first service for each of a plurality of available providers to generate the plurality of available services facilitated by a plurality of providers.

9. The system of claim 7, wherein the processor is further adapted for performing at least one of:
   specifying the first service as a parental node of the directed acyclic graph, and
   specifying the at least one requirement as a child node of the directed acyclic graph.

10. The system of claim 7, wherein the processor is further adapted for, pursuant to constructing the directed acyclic graph, interrelating at least one group requirement dependency.

11. The system of claim 7, wherein the processor is further adapted for defining means for obtaining from the provider at least one of a start, a stop, and a get status operation.

12. The system of claim 7, wherein the processor is further adapted for, pursuant to the startup sequence, providing the first service and the second service represented by the directed acyclic graph as a target; wherein the first service is derived by the initialization process from the target.

13. The system of claim 7, wherein the processor is further adapted for, pursuant to the analysis of the which of the available plurality of services to provide in view of the at least one hardware resource in the data storage subsystem, attempting each possible service of the plurality of services.

14. A computer program product for managing services within a data storage subsystem using a processor in communication with a memory device during a startup sequence, the computer program product comprising a non-transistory computer-readable storage medium having computer-readable program code portions stored therein, the computer-readable program code portions comprising:
   a first executable portion for defining a first service facilitated by a provider, wherein the provider is operational by the processor;
   a second executable portion for linking at least one requirement to the first service;
   a third executable portion for incorporating the first service and the at least one requirement into a specification file;
   a fourth executable portion for constructing a directed acyclic graph interrelating the first service and a second service based on the at least one requirement; and
   a fifth executable portion for traversing the directed acyclic graph using an initialization process to generate a determination which of an available plurality of services to provide; wherein:
      the determination further includes an analysis of the which of the available plurality of services to provide in view of at least one hardware resource in the data storage subsystem, and
      constructing the directed acyclic graph comprises interrelating the first service and the second service based on one of a weak requirement dependency and a strong requirement dependency of the first service and the second service, the weak requirement dependency comprising starting the second service after starting the first service and the strong requirement dependency comprising starting the second service prior to starting the first service.

15. The computer program product of claim 14, wherein the first executable portion for the defining the first service performs the defining the first service for each of a plurality of available providers to generate the available plurality of services facilitated by a plurality of providers.

16. The computer program product of claim 14, further including a sixth executable portion for performing at least one of:
   specifying the first service as a parental node of the directed acyclic graph, and
   specifying the at least one requirement as a child node of the directed acyclic graph.

17. The computer program product of claim 14, wherein the fourth executable portion for constructing the directed acyclic graph is further adapted for interrelating at least one group requirement dependency.

18. The computer program product of claim 14, wherein the third executable portion for incorporating the first service and the at least one requirement into the specification file defines means for obtaining from the provider at least one of a start, a stop, and a get status operation.

19. The computer program product of claim 14, further including a sixth executable portion for, pursuant to the startup sequence, providing the first service and the second service represented by the directed acyclic graph as a target; wherein the first service is derived by the initialization process from the target.

20. A method of manufacturing a system for managing services within a data storage subsystem during a startup sequence, comprising:
   providing a storage module operational in the data storage subsystem, wherein the storage module is adapted for:

defining a first service facilitated by a provider, wherein the provider is operational on the data storage subsystem, linking at least one requirement to the first service, incorporating the first service and the at least one requirement into a specification file, constructing a directed acyclic graph interrelating the first service and a second service based on the at least one requirement, and traversing the directed acyclic graph using an initialization process to generate a determination which of an available plurality of services to provide; wherein:

the determination further includes an analysis of the which of the available plurality of services to provide in view of at least one hardware resource in the data storage subsystem, and constructing the directed acyclic graph comprises interrelating the first service and the second service based on one of a weak requirement dependency and a strong requirement dependency of the first service and the second service, the weak requirement dependency comprising starting the second service after starting the first service and the strong requirement dependency comprising starting the second service prior to starting the first service.

21. The method of manufacture of claim 20, wherein the storage module is further adapted for performing the defining the first service for each of a plurality of available providers to generate the plurality of available services facilitated by a plurality of providers.

22. The method of manufacture of claim 20, wherein the storage module is further adapted for performing at least one of:

specifying the first service as a parental node of the directed acyclic graph, and specifying the at least one requirement as a child node of the directed acyclic graph.

23. The method of manufacture of claim 20, wherein the storage module is further adapted for, pursuant to constructing the directed acyclic graph, interrelating at least one group requirement dependency.

24. The method of manufacture of claim 20, wherein the storage module is further adapted for defining means for obtaining from the provider at least one of a start, a stop, and a get status operation.

25. The method of manufacture of claim 20, wherein the storage module is further adapted for, pursuant to the startup sequence, providing the first service and the second service represented by the directed acyclic graph as a target; wherein the first service is derived by the initialization process from the target.

* * * * *